Sept. 23, 1924.   1,509,472
E. O. CAREY
WINDMILL
Filed Aug. 28, 1922   2 Sheets-Sheet 1
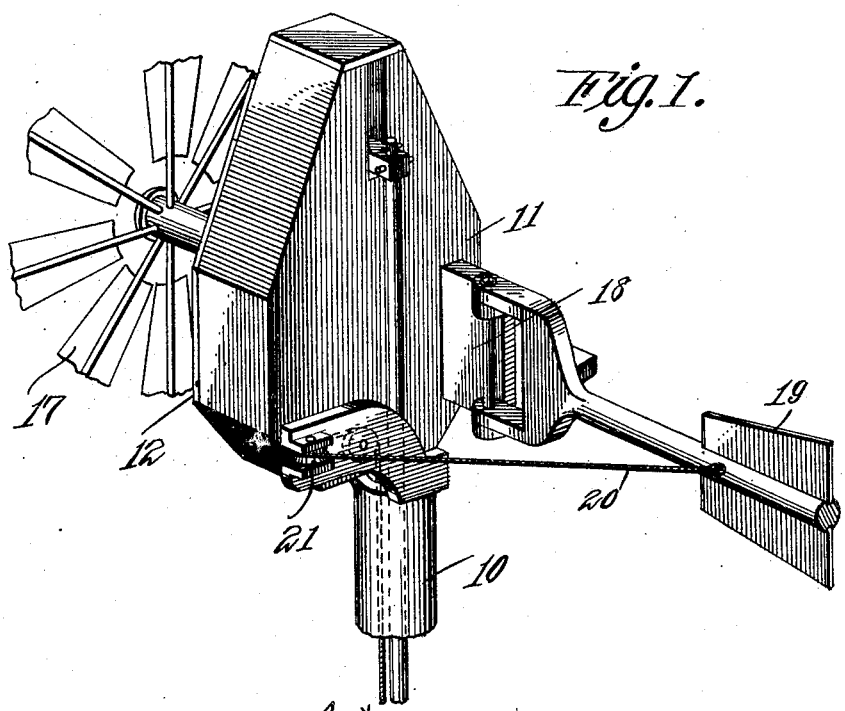
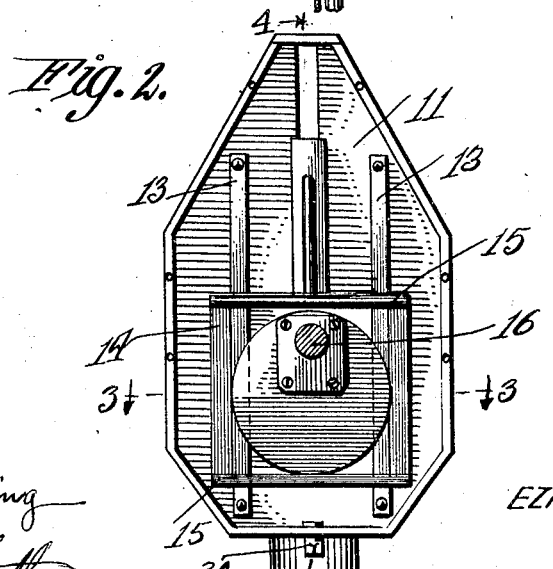
WITNESSES
Inventor
EZRA O. CAREY
By
Richard K. Owen., Attorney

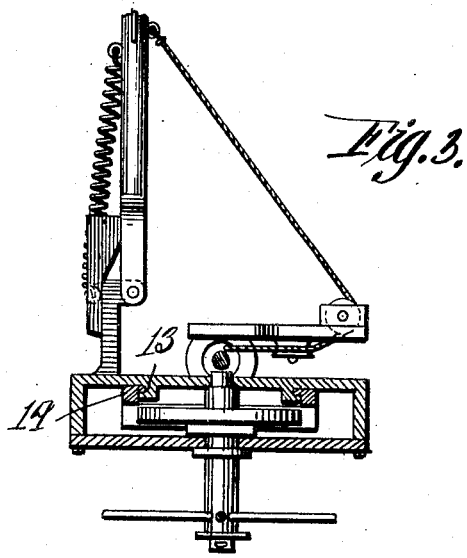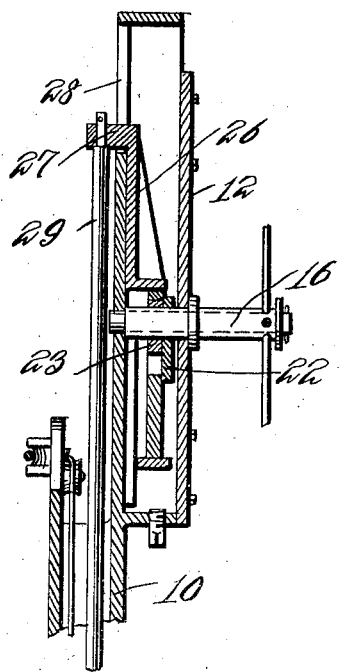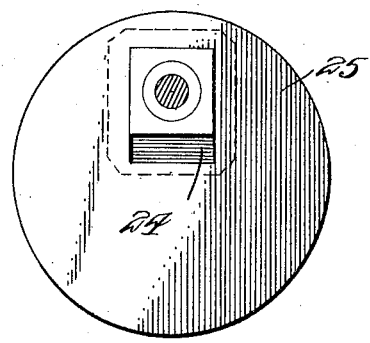
EZRA O. CAREY

Patented Sept. 23, 1924.

1,509,472

UNITED STATES PATENT OFFICE.

EZRA O. CAREY, OF MARION, INDIANA.

WINDMILL.

Application filed August 28, 1922. Serial No. 584,793.

*To all whom it may concern:*

Be it known that I, EZRA O. CAREY, a citizen of the United States, residing at Marion, in the county of Grant and State of Indiana, have invented certain new and useful Improvements in Windmills, of which the following is a specification.

This invention relates to wind mills and has special reference to the power transmission of such devices.

More particularly the invention relates to what I preferably term a self oiling wind pump engine.

One important object of the invention is to improve the general construction of devices of this character.

A second important object of the invention is to provide an improved and simple device of this character in which all of the moving parts will be enclosed in an oil containing casing wherever they frequently engage each other so that these parts will be properly lubricated.

A third important object of the invention is to provide a novel transmission mechanism for converting horizontal rotary movement into vertical reciprocating movement.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1 is a perspective view of a portion of a wind mill and showing the improved device as applied thereto.

Figure 2 is a front view of the device with the cover plate removed.

Figure 3 is a section on the line 3—3 of Figure 2.

Figure 4 is a section on the line 4—4 of Figure 2.

Figure 5 is a detail view of the rear side of the eccentric member.

At the upper end of the wind mill tower there is provided a tube 10 whereon is supported a casing 11 having a removable front plate 12. Secured to the back wall of this casing is a pair of guide rails 13. On these guide members is mounted a reciprocating frame having vertical side rails 14 which bear against the outer side of each respective guide rail 13 and these vertical members are connected by transverse members 15 the frame thus being rectangular. Extending through the front wall or cover 12 is the wind wheel shaft 16 whereon is mounted a wind wheel 17 of any preferred construction. On the back of the casing is a lug 18 supporting the tail vane 19 which is controlled by means of a rope 20 passing over the pulleys 21 and down through the tube 10. Within the casing on the shaft 16 is fixed a plate 22 whereon is a rectangular block 23 fitting slidably in a recess 24 formed in an eccentric disc 25. This eccentric disc is of substantially the same diameter as the distance between the members 15 and lies between these members so that rotation of the shaft 16 causes reciprocation of the frame. Projecting upwardly from this frame is a bracket 26 which has a rearwardly extending upper end 27 passing through a slot 28 formed in the upper part of the rear wall of the casing. Secured in any suitable manner to this end 27 is the sucker rod 29 which passes down through the tube 10. At 30 is a drain plug and it is intended that the lower part of the casing 11 is to be filled with oil so that the eccentric will dip therein and thus splash the oil around the various parts which are in frictional engagement and keep them thoroughly lubricated. By this means the necessity of ascending the wind mill tower at frequent intervals for the purpose of oiling the moving parts is entirely eliminated and not only is this inconvenience obviated but by reason of the plentiful supply of lubricant the wear on the parts becomes practically nothing so that an extremely long life is obtained in this manner for the mechanism.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention what is claimed as new, is:—

In a device of the kind described, a casing having a removable front plate, the lower part of said casing and front plate being made to retain oil, a pair of vertical guide rails mounted on the rear wall of said casing, a frame comprising a pair of vertical members engaging outside faces of the guide rails and transverse members connecting said vertical members and positioned in front of the guide rails, a wind wheel shaft extending into the casing, an eccentric mounted on the wind wheel shaft and positioned between the transverse members of the frame, a bracket extending up from the upper transverse member to the upper part of the frame and having a lateral extension at its upper end passing through the rear wall of said casing, said casing being provided with a vertical slot to accommodate said lateral extension and a sucker rod connected with the lateral extension outside of said casing.

In testimony whereof I affix my signature in presence of two witnesses.

EZRA O. CAREY.

Witnesses:
HAZEL M. THOMPSON,
CLARA E. BAHR.